United States Patent
Cramer et al.

(10) Patent No.: US 12,405,832 B2
(45) Date of Patent: Sep. 2, 2025

(54) DYNAMIC RECONFIGURATION OF MICROSERVICE TEST ENVIRONMENT

(71) Applicant: INTERNATIONAL BUSINESS MACHINES CORPORATION, Armonk, NY (US)

(72) Inventors: Keith Donald Cramer, Pine Island, MN (US); Priya Ajay Ingle, Austin, TX (US); Ramkumar Gowrishankar, Apex, NC (US); Jiawei Wen, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 437 days.

(21) Appl. No.: 18/169,253

(22) Filed: Feb. 15, 2023

(65) Prior Publication Data
US 2024/0272954 A1    Aug. 15, 2024

(51) Int. Cl.
*G06F 9/50* (2006.01)
*G06F 11/3698* (2025.01)

(52) U.S. Cl.
CPC ........ *G06F 9/5055* (2013.01); *G06F 11/3698* (2025.01)

(58) Field of Classification Search
None
See application file for complete search history.

(56) References Cited

U.S. PATENT DOCUMENTS

| 6,970,869 B1 * | 11/2005 | Slaughter | G06F 9/5055 |
| | | | 707/999.102 |
| 8,639,983 B1 * | 1/2014 | Desai | G06F 11/3698 |
| | | | 709/219 |

(Continued)

FOREIGN PATENT DOCUMENTS

| CN | 105631196 B | 6/2016 |
| CN | 110971623 A | 4/2020 |

(Continued)

OTHER PUBLICATIONS

International Search Report for PCT Application No. PCT/IB2024/050656 mailed Aug. 27, 2024. 6 pages.

(Continued)

*Primary Examiner* — Craig C Dorais
(74) *Attorney, Agent, or Firm* — Aaron Pontikos, Esq; Kevin P. Radigan, Esq.; Heslin Rothenberg Farley & Mesiti P.C.

(57) ABSTRACT

Processing within a computing environment is facilitated by determining a set of microservices needed to execute a microservice test suite in a test environment, where the test environment is an active microservice test environment with a plurality of microservices. The process also includes determining that the test environment lacks sufficient resources to run the microservice test suite with the set of microservices, and dynamically removing at least one microservice of the plurality of microservices from the test suite not needed to execute the microservice test suite to free test environment resources for executing the microservice (Continued)

test suite with the set of microservices. The process also includes initiating executing, based on the dynamically removing, the microservice test suite in the test environment.

20 Claims, 7 Drawing Sheets

(56) References Cited

U.S. PATENT DOCUMENTS

| | | | |
|---|---|---|---|
| 11,314,630 | B1 | 4/2022 | Perumal et al. |
| 11,451,601 | B2 | 9/2022 | Jonsson et al. |
| 2022/0236978 | A1 | 7/2022 | Yu |
| 2024/0037019 | A1* | 2/2024 | Aird .................... G06F 11/3696 |

FOREIGN PATENT DOCUMENTS

| | | |
|---|---|---|
| CN | 108021447 B | 8/2021 |
| CN | 113220573 A | 8/2021 |
| CN | 112241822 B | 7/2022 |
| CN | 114942833 A | 8/2022 |
| CN | 115421851 A | 12/2022 |
| WO | WO 2018/121210 A1 | 7/2018 |
| WO | WO 2021/213004 A1 | 10/2021 |
| WO | WO 2022/178730 A1 | 9/2022 |
| WO | 2024/170973 A2 | 8/2024 |

OTHER PUBLICATIONS

Kapfhammer et al., "Testing in Resource Constrained Execution Environments", Proceedings of the 20th IEEE/ACM International Conferences on Automated Software Engineering (Nov. 5, 2005) (pp. 418-422) (Year: 2005).

Walcott-Justice, Kristen R., "Testing in Resource-Constrained Environments", University of Virginia, School of Engineering and Applied Science, May 2012 (163 pages) (Year: 2012).

"Horizontal Pod Autoscaling", Kubernets, Jan. 27, 2023, 8 pages, https://web.archive.org/web/20230127213754/https://kubernetes.io/docs/tasks/run-application/horizontal-pod-autoscale/.

No Author. "Eliminating Local Resource Constraints for Building Cloud Native Applications—A guide to setting up shared development environments for teams on Kubernetes", retrieved from web https://web.archive.org/web/20220707073805/https://www.getambassador.io/resources/eliminate-local-resource-constraints/, Jul. 7, 2022, 6 pages.

No Author. "Plutora", Planview, 2024, 4 pages.

No Author. "Vertical Pod Autoscaler", retrieved from web https://web.archive.org/web/20221006182739/https://docs.aws.amazon.com/eks/latest/userguide/vertical-pod-autoscaler.html, Oct. 6, 2022, 9 pages.

\* cited by examiner

DYNAMIC RECONFIGURATION OF MICROSERVICE TEST ENVIRONMENT

BACKGROUND

One or more aspects relate, in general, to enhancing processing within a computing environment, and more particularly to dynamic reconfiguration of an active microservice test environment through selective removal of one or more microservices from the test environment to free test environment resources to facilitate execution of a microservice test suite.

In a microservice computing environment, or microservice infrastructure system, an application can be created as a collection of services, or microservices. Each microservice executes independently, and can use application programming interfaces (APIs) to communicate with other services.

Microservice testing is typically via a microservice test suite, which can be a collection of one or more test cases grouped for test execution to, for instance, test a software program to confirm that the program has one or more specified sets of functions.

Microservice infrastructure systems, such as microservice-based cloud infrastructure systems, often include a large set of components. In a production environment, these systems are hosted by large-scale data centers with massive resource capacities. However, in a testing scenario, it is common to have only a single test environment with limited resource capacity. In certain instances, the active test environment may lack sufficient resources (e.g., nodes, memory, CPU, storage, etc.) to run all the microservices needed for a particular microservice test suite.

SUMMARY

Certain shortcomings of the prior art are overcome, and additional advantages are provided herein through the provision of a computer-implemented method of facilitating processing within a computing environment. The computer-implemented method includes: determining a set of microservices needed to execute a microservice test suite in a test environment, the test environment being an active microservice test environment with a plurality of microservices, and determining that the test environment lacks sufficient resources to execute the microservice test suite using the set of microservices. Further, the computer-implemented method includes dynamically removing at least one microservice of the plurality of microservices from the test environment not needed to execute the microservice test suite, where the dynamic removing of the at least one microservice frees the test environment resources to facilitate executing the microservice test suite using the set of microservices. Further, the process includes initiating executing, based on the dynamically removing, the microservice test suite in the test environment.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, hardware, tools, or data processing environments only as example for clarity of description. The illustrative embodiments can be used in conjunction with other comparable or similarly purposed structures, systems, applications, or architectures. One or more aspects of an illustrative embodiment can be implemented in software, hardware, or a combination thereof.

Figure 1:
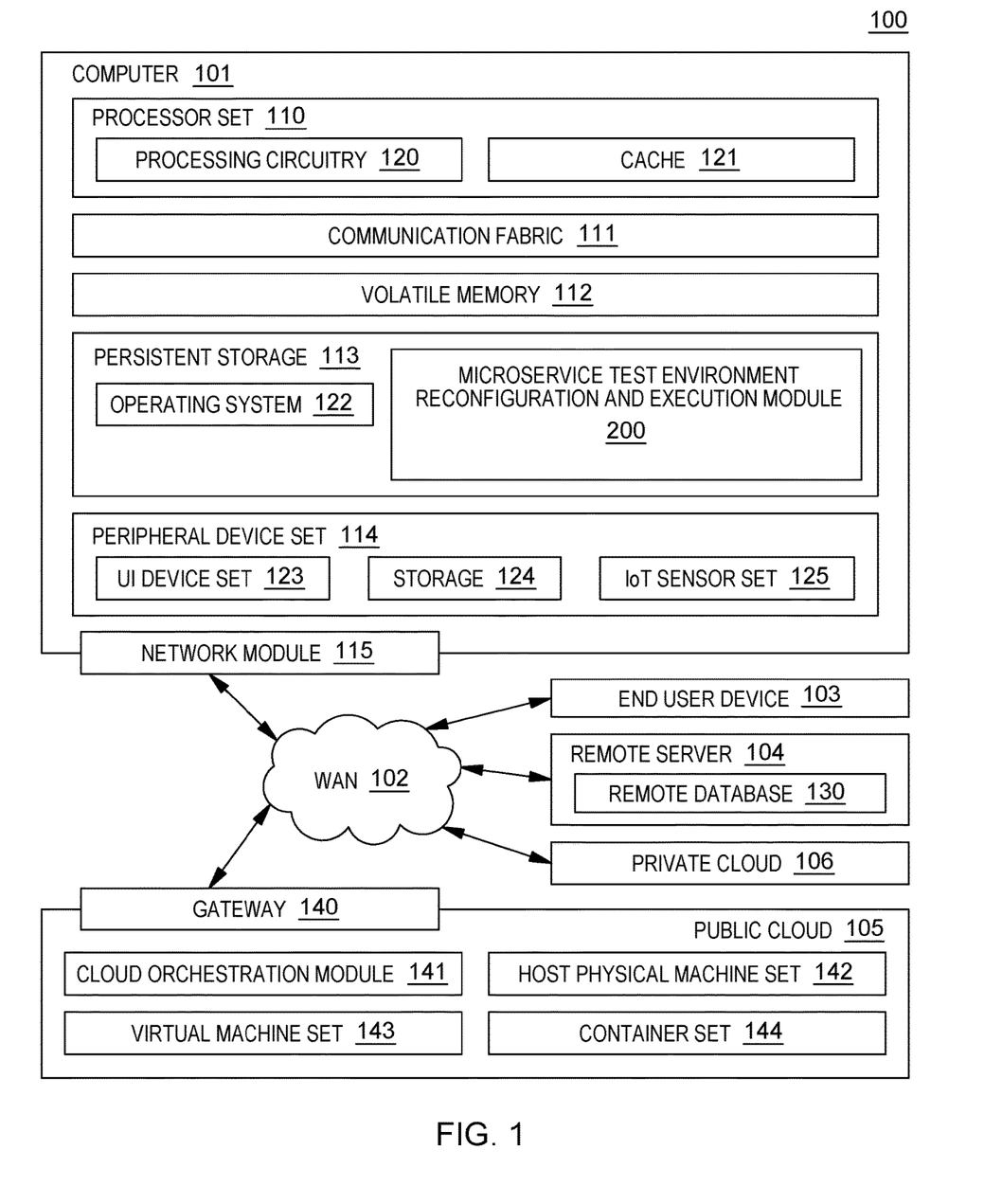
FIG. 1 depicts one example of a computing environment to include and/or use one or more aspects of the present invention.

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 1, including operating system 122 and microservice test environment reconfiguration and execution module 200, which are stored in persistent storage 113.

One or more aspects of the present invention are incorporated in, performed and/or used by a computing environment. As examples, the computing environment can be, or include, an environment of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform microservice test environment reconfiguration and test execution initiation processing, such as disclosed herein. Aspects of the present invention are not limited to a particular architecture or environment.

Prior to further describing detailed embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as microservice test environment reconfiguration and execution module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. Further, in one or more embodiments, one or more of the components/modules of FIG. 1 need not be included in the computing environment and/or are not used for one or more aspects of the present invention. Further, in one or more embodiments, additional and/or other components/modules can be used. Other variations are possible.

Figure 2:
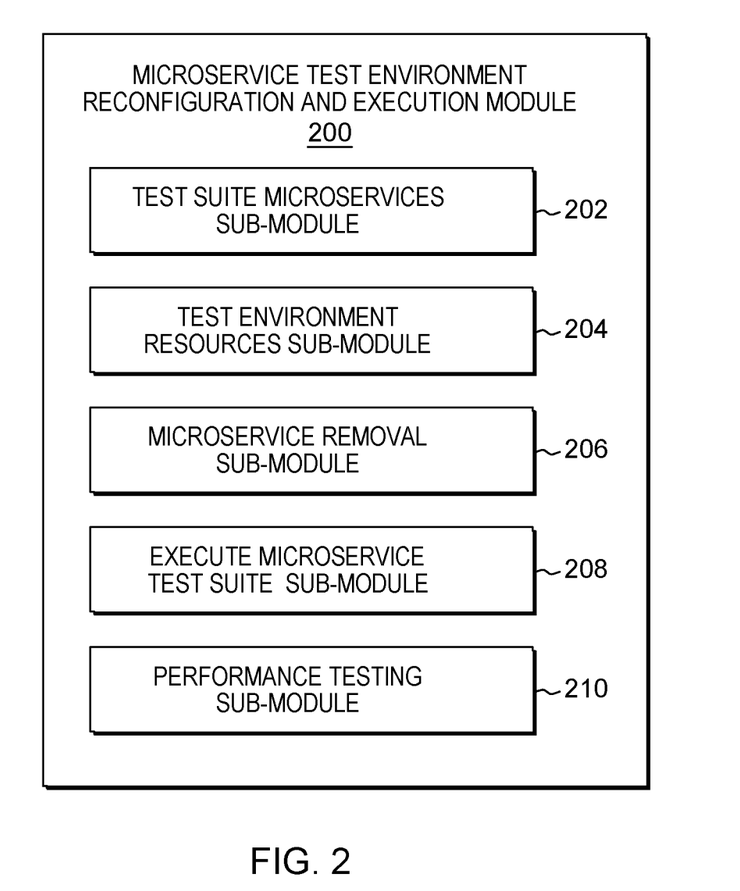
FIG. 2 depicts one embodiment of a computer program product with a microservice test environment reconfiguration and execution module, in accordance with one or more aspects of the present invention.
Figure 3:
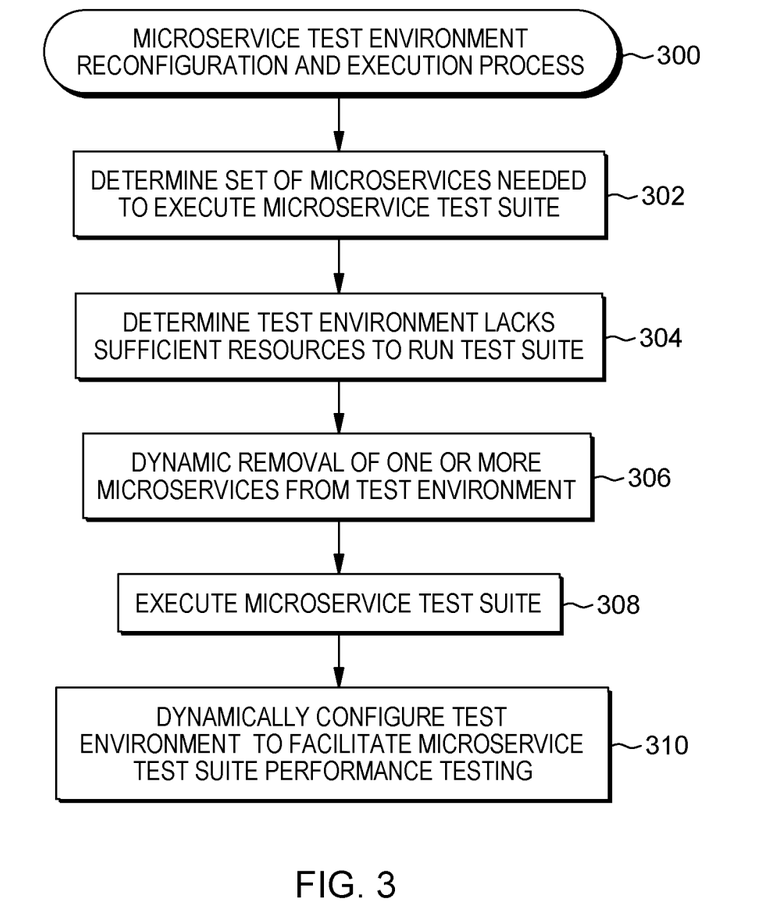
FIG. 3 depicts one embodiment of a microservice test environment reconfiguration and execution process, in accordance with one or more aspects of the present invention.

By way of example, one or more embodiments of a microservice test environment reconfiguration and execution module and process are described initially with reference to FIGS. 2-3. FIG. 2 depicts one embodiment of microservice test environment reconfiguration and execution module 200 that includes code or instructions to perform processing in accordance with one or more aspects of the present invention, and FIG. 3 depicts one embodiment of a microservice test environment reconfiguration and execution process, in accordance with one or more aspects of the present invention.

Referring to FIGS. 1 & 2, microservice test environment reconfiguration and execution module 200 includes, in one example, various sub-modules used to perform processing, in accordance with one or more aspects of the present invention. The sub-modules are, e.g., computer-readable program code (e.g., instructions) and computer-readable media (e.g., persistent storge (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

In the FIG. 2 embodiment, example sub-modules of a microservice test environment reconfiguration and execution module 200 include, for instance, a test suite microservices sub-module 202 to determine a set of microservices needed to execute a microservice test suite in a test environment, where the test environment is an active microservice test environment with a plurality of active microservices; a test environment resources sub-module 204 to determine that the test environment lacks sufficient resources to execute the microservice test suite with the set of microservices; a microservice removal sub-module 206 to dynamically remove at least one microservice of the plurality of microservices from the test environment not needed to execute the microservice test suite, where the dynamic removing of the microservice(s) frees test environment resources to facilitate executing the microservice test suite using the set of microservices (and optionally, where the dynamic removing of the microservice(s) includes generating a data structure identifying the at least one microservice dynamically removed from the test environment to free test environment resources); and an execute microservice test suite sub-module 208 to initiate executing, based on the dynamic removing of the microservice(s), the microservice test suite in the test environment. Further, in one or more implementations, microservice test environment reconfiguration and execution module 200 can include a performance testing sub-module 210 to, for instance, facilitate iterative, dynamic removal of different available microservices of the plurality of active microservices of the test environment, while executing the microservice test suite to determine an optimal resource allocation for scaling up the microservice test suite in the test environment for performance testing. Advantageously, the microservice test environment reconfiguration and execution process disclosed herein takes an active microservice test environment and reconfigures the environment in order to accommodate execution of a microservice test suite, notwithstanding that there may have been insufficient capacity to run required resources for the test suite prior to the reconfiguration. Note that although various sub-modules are described, microservice test environment reconfiguration and execution module processing such as disclosed herein can use, or include, additional, fewer, and/or different sub-modules. A particular sub-module can include additional code, including code of other sub-modules, or less code. Further, additional and/or other modules can be used. Many variations are possible.

In one or more embodiments, the sub-modules are used, in accordance with one or more aspects of the present invention, to perform microservice test environment reconfiguration and execution processing. FIG. 3 depicts one example of a process, such as disclosed herein. The process is executed, in one or more examples, by a computer (e.g., computer 101 (FIG. 1)), and/or a processor or processing circuitry (e.g., of processor set 110 of FIG. 1). In one example, code or instructions implementing the process, are part of a module, such as microservice test environment reconfiguration and execution module 200. In other examples, the code can be included in one or more other modules and/or in one or more sub-modules of the one or more other modules. Various options are available.

As one example, microservice test environment reconfiguration and execution process 300 executing on a computer (e.g., computer 101 of FIG. 1), a processor (e.g., a processor of processor set 110 of FIG. 1), and/or processing circuitry (e.g., processing circuitry of processor set 110) determines a set of microservices needed to execute a microservice test suite in a test environment 302, and determines whether the microservice test environment lacks sufficient resources to execute the test suite with the set of microservices 304, that is, processing determines or detects the available resources in the microservice test environment for running the microservice test suite. In one or more implementations, the test environment is an active microservice test environment with a plurality of actively running microservices, and is a more constrained environment than a production environment that is to run the microservice under test in end use. The process further includes dynamic removal of one or more microservices from the active microservice test environment 306, which can include dynamically identifying and removing one or more unneeded microservices from the test environment and/or removing one or more explicitly-noted, optional microservices from the test environment, which have been identified via for instance, a data structure associated with the microservice test suite. For instance, in one embodiment, the test suite identifies certain microservices required to execute the test suite, and other microservices not required, which can optionally be removed to facilitate execution of the test suite in the available test environment. In one or more embodiments, along with removing at least one microservice of the plurality of microservices from the active microservice test environment not needed to execute the microservice test suite, the process generates a data structure identifying the at least one microservice removed from the test environment to free test environment resources and facilitate execution of the microservice test suite. The microservice test suite is deployed into the test environment and the one or more test cases of the test suite are executed within the reconfigured microservice test environment 308, which can include, in one or more embodiments, generating a test result report that identifies the one or more microservices dynamically removed from the test environment to facilitate executing of the microservice test suite with the needed set of microservices.

In one or more implementations, microservice test environment reconfiguration and execution processing 300 can further optionally include dynamically configuring the test environment to facilitate microservice test suite performance testing 310. In one embodiment, this can include iteratively, dynamically removing different available microservices from the active microservice test environment, while executing the microservice test suite to determine an optimal resource allocation for scaling-up the microservice test suite for the performance testing. In one or more other embodiments, the processing can iterate over the microservice test suite execution to dynamically identify and update the list of microservices required to execute the microservice test suite.

As noted, microservice-based infrastructure systems, such as cloud infrastructure systems, often include a large set of components. In production, these systems are hosted by large-scale data centers with massive capacities. However, in a testing scenario, it is common to have only a single, constrained microservice test environment, with limited capacity. The issue with a limited test environment is that there may not be sufficient resources (e.g., nodes, memory, CPU, storage, etc.) to run all of the microservices needed for a particular microservice test suite. Typically, a microservice test case does not need all of the microservices deployed and running or active in a microservice test environment, but can execute on a subset of the services that are running. Advantageously disclosed herein, are computer-implemented methods, computer systems, and computer program products to facilitate automatically configuring or tailoring the active test environment to facilitate running a microservice test suite with a needed set of microservices.

In one embodiment, the microservice test environment reconfiguration and execution process creates a test-dependency definition of microservices (e.g., resources) needed for a test suite (e.g., CPU, memory, additional resources in the environment, such as dependent microservices, or other microservices, pods, services, config maps, ingress, etc.). The definition can include a needed or required list of microservices that cannot be evacuated or removed during the entire test execution. This definition can include a RemoveOptionalResourcesFlag, which can be used to ensure that only required microservices are running in the test environment during the test, which can result in one or more types of microservices being entirely removed from the test environment for that test.

In one or more implementations, the microservice test environment reconfiguration and execution processing disclosed allows microservices that will not be utilized in a test path to be removed (e.g., deactivated, evicted, evacuated) safely, while allowing for the return or reestablishing of the microservice test environment, that existed before the dynamically removing of one or more microservices, after test completion. Advantageously, this allows focused, local testing of microservices designed to run on cloud infrastructure systems to be scheduled on a single, active microservice test environment with limited resource capacity. After the test is completed, the removed or evicted microservices, or resources, are restored for the next microservice test suite. The invention further allows the execution of a test with iterative removal of optional resources so that performance scaling can be performed as part of the test.

In one or more embodiments, the microservice test environment reconfiguration and execution processing disclosed herein further includes, in addition to creating the test-dependency definition of microservices needed for a test suite to execute, creating another list of environmental required resources that are needed for the test environment itself, independent of the test suite (e.g., API server, Vault), and this list is added to the needed set of microservices that cannot be removed. Further, certain microservices may need to maintain state, and these microservices as well are added to the list of needed microservices to execute the microservice test suite. As part of executing the microservice test suite, one or more microservices not in the list of needed microservices may be removed if needed based on resource requirements for the microservice test suite to execute. For instance, if there is insufficient CPU to run one or more test cases of the test suite, certain microservices not in the list of needed microservices can be dynamically removed so that the test can successfully run in the active test environment. Further, if the RemoveOptionalResourcesFlag is set, which forces removal of any optional microservices, all optional microservices currently active in the test environment are automatically removed. After successful completion of the microservice test suite in the test environment, the removed microservices are restored for execution of a next microservice test suite in the test environment.

In one or more aspects, the microservice test environment reconfiguration and execution process further includes generating a report which identifies which microservices were removed for the microservice test suite to execute. Further, in one or more embodiments, the process can execute as a dry-run, where the actual test suite is not executed, but rather, processing verifies that resource requirements are determined, and a report is provided indicating which microservices would be removed in order to run the microservice test suite in the test environment.

In one or more embodiments, if a needed microservice is removed, and one or more test cases of the test suite fail to complete execution, this can be captured so that the test-dependency definition can be updated to include the identified needed microservice(s). Optionally, the process can also automatically add the newly uncovered, required microservice(s) to the requirements list for running the microservice test suite, and automatically rerun the test. If the test is iterated on, and a new list of dependencies is detected, this is reported back so that the definition of needed microservices for executing the microservice test suite can be updated. If the test suite is unable to execute because there is no combination of microservices that can be removed from the active test environment and still meet the list of required microservices, this can also be reported, for instance, to a user of the system.

Advantageously, the microservice test environment reconfiguration and execution process disclosed herein allows a microservice test suite to be executed in a single, active microservice test environment which could not otherwise execute the test suite. Required microservices for testing are determined in order to fit a specific microservice test suite into an active test environment, for instance, so actual resource consumption is optimized for execution of the test suite, which facilities the execution of the test suite in the single, active test environment, with constrained resource capacities (that is, compared with the end-use production environment). Processes disclosed herein also provide a mechanism to explicitly remove optional resources for a particular test so that the needed microservices can use all the resource capacity of the test environment for scale/performance testing. Advantageously, processing disclosed herein does not impact existing deployments, as the process dynamically removes and restores microservices from the test environment. As different test suites are executed in the environment, the mix of running microservices can change, but the environment is restored back to the normal or starting deployed microservices once complete. Further, in one or more embodiments, processing disclosed herein can be used to verify if a test suite can be executed in a microservice test environment, and to adjust active microservices in the environment as needed to fit different test cases. This allows better management of resources in the testing environment. In one embodiment, the processing disclosed includes an automatic error reconciliation facility to fix a failure caused by an unexpected microservice removal, such as in the case of an unknown microservice dependency required to execute a particular microservice test case. In one or more implementations, the present invention can be used in microservice test environments. For instance, the processing can be used across multiple control planes of an environment to reduce development test environment requirements.

Figure 4:
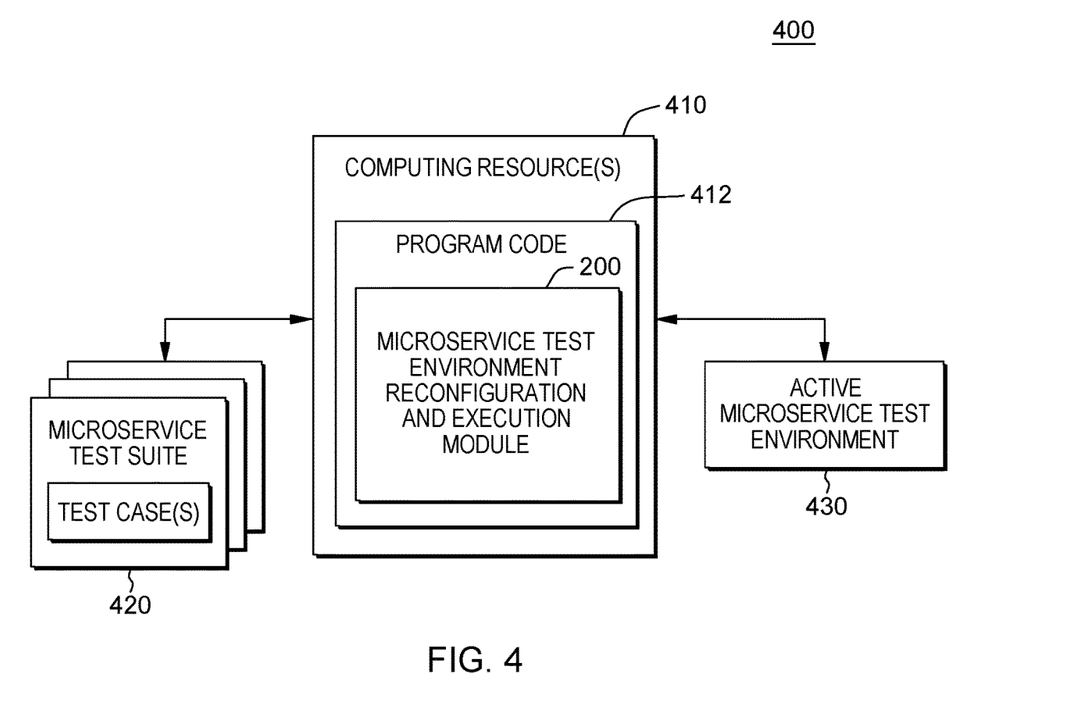
FIG. 4 is a further example of a computing environment to include and/or use one or more aspects of the present invention.

By way of further explanation, FIG. 4 depicts another embodiment of a computing environment or system 400, which can incorporate, or implement, one or more aspects of an embodiment of the present invention. In one or more implementations, system 400 is implemented as part of a computing environment, such as computing environment 100 described above in connection with FIG. 1. System 400 includes one or more computing resources 410 that execute program code 412 that implements, for instance, one or more aspects of a module or facility such as disclosed herein, such as microservice test environment reconfiguration and execution module 200.

In computing environment 400, one or more microservice test suites 420, each including one or more test cases, are to be executed in a constrained, active microservice test environment 430, such as a clustered test environment. For instance, in one or more embodiments, microservice test suite 420 includes specific test cases for functional testing of a microservice intended to execute, for instance, in a cloud-based runtime or production environment.

Microservice test environment reconfiguration and execution module 200 determines, in one or more embodiments, a set of microservices needed to execute a microservice test suite in the test environment 430, and determines the available resource capacity of the active test environment, that is, whether the active test environment lacks sufficient resources to execute the microservice test suite with the set of needed microservices. Further, microservice test environment reconfiguration and execution module 200 dynamically removes one or more microservices of the plurality of microservices of the active test environment not needed to execute the microservice test suite, with the dynamically removing freeing test environment resources to facilitate executing the microservice test suite with the set of needed microservices. Microservice test environment reconfiguration and execution module 200 then deploys the microservice test suite to the test environment to initiate executing of the microservice test suite in the test environment based on the dynamic removing of the microservice(s) of the plurality of microservices of the test environment. Optionally, a test execution report can be generated based on executing the microservice test suite in the test environment. In one or more embodiments, the test execution report can include an indication of whether sufficient resources were available to fully execute the microservice test suite in the test environment, that is, whether all needed microservices for test suite execution were available in the microservice test environment.

System 400 can include, or utilize, one or more networks for interfacing various aspects of the system including, for example, a database containing one or more microservice test suites 420, the computing resource(s) 410, and one or more active microservice test environments 430. By way of example, the network(s) can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, such as discussed herein.

In one or more implementations, computing resource(s) 410 houses and/or executes program code 412 configured to perform processes in accordance with one or more aspects of the present invention. By way of example, computing resource(s) 410 can be a computing-system-implemented resource(s). Further, for illustrative purposes only, computing resource(s) 410 in FIG. 4 is depicted as being a single computing resource separate from the microservice test suite database and the test environment. This is a non-limiting example of an implementation. In one or more other implementations, the microservice test suite(s) 420 and/or active microservice test environment 430 can execute on the same computing resource(s) 410 as the microservice test environment reconfiguration execution module 200. In one or more further implementations, one or more aspects of the microservice test environment reconfiguration and execution module 200 can, at least in part, be implemented in multiple separate computing resources or systems.

Briefly described, in one embodiment, computing resource(s) 410 can include one or more processors, for instance, central processing units (CPUs). Also, the processor(s) can include functional components used in the integration of program code, such as functional components to fetch program code from locations in such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s) or a computer system(s) which can implement one or more aspects disclosed are described further herein with reference to the figures.

In one or more implementations, the microservice test environment reconfiguration and execution processes disclosed herein determine a set of microservices, or resources, required to execute the microservice test suite. This can include evaluating the microservice test suite, including any microservice dependency chains within the test. Further, the process includes determining or detecting that insufficient resources are available in the current active test environment to successfully run the microservice test suite with the needed microservices. Based on this, one or more optional resources, or microservices, are removed from the test environment, where the one or more microservices can be determined dynamically and/or explicitly listed (e.g., in the microservice test suite). In one or more embodiments, the microservice test suite is then deployed to the test environment, which results in executing the test plan in the test environment. This execution of the test plan can either be a dry-run, in one embodiment, or the actual execution of the microservice test suite. In a dry-run scenario, the test cases themselves are not executing, but rather, processing determines resources needed to run the test suite. A test result report can be generated, including what microservices or resources were evacuated to execute the microservice test suite, and in one embodiment, the test plan for the microservice test suite can be automatically updated with any additional required microservices for running the test suite. In one or more embodiments, the processing can iterate over the test execution to dynamically update microservices required to execute the test suite, and to update the test suite list of needed services.

As one example, in a case where a new feature is being developed and new resources are needed to be deployed and tested in a test case, the new feature may require new microservices (e.g., new pods or software servers) to be spun-up to support the feature. The new microservices may not fit into an existing, active test environment. In this example, the microservices or resources needed are added to the microservice test plan, and the test case is submitted to the system for analysis. The system (or microservice test environment reconfiguration and execution module or facility) determines that the new microservices needed for the feature to be tested cannot be executed within the current active test environment. Based on this, the system dynamically removes one or more microservices or resources not required to execute the microservice test suite, such as, for instance, monitoring microservices (e.g., SYSDIG, LOGDNA), etc. The test suite is executed, after which, the microservice resources added for the new feature are removed from the test environment, and the previously removed microservices of the test environment are restored to the test environment. Note that the list of optional microservices can be determined by comparing an input required microservices list of the test suite against the available microservices in the test environment. For instance, monitoring/logging resources, such as the noted SYSDIG and LOGDNA, might not be listed in the required microservice list, and are therefore candidates to be removed. Another example would be in the case of testing a networking microservice, existing storage-related microservices may not be listed as required.

As another example, in a case where performance testing is needed, there may be certain services or pods required for a test case that need large amounts of resources (e.g., CPU and/or memory) to run a large-scale performance test. For test isolation, all services not in the required microservices list for the test case are dynamically removed to allow the required services to scale-up and consume more CPU and/or memory when the test case is executing. Therefore, in this use case, all microservices not in the required microservice list for the test suite are to be removed, which can result in one or more types of microservices being completely removed. In one embodiment, the process of removing all unneeded microservices for the test plan to execute can be indicated with a "RemoveOptionalResourcesFlag" equal to true. The test case is submitted to the system, and the system removes all test environment resources not in the list of needed microservices for the test case, which frees the maximum possible resources of the test environment. The test suite is executed, and any microservices added for the test suite performance testing are then removed from the test environment, and the previously removed microservices of the active test environment are restored, that is, restarted (in one embodiment). In this use plan, the microservice test environment configuration and execution process temporarily removes all optional microservices, even if they could concurrently execute with the required microservices for the test suite, in order to optimize the performance testing.

One or more aspects of the dynamic reconfiguration of microservice test environments disclosed herein encompass a method to facilitate testing microservices in a resource-constrained environment by dynamically removing one or more active microservices that are not required for the testing. At a high level, the process obtains a test suite, which is a set of tests that need to be executed on a resource-constrained environment. Typically, the tests in the test suite are related, and test a subset of the functional capabilities of the overall system. In a conventional system, the test suite would directly interact with the test environment, and start the running of tests. In this disclosure, the test suite interacts first with the microservice test environment reconfiguration and execution facility or module to determine if the test environment can run the tests, and if any microservices need to be removed prior to running the tests. The test environment is a resource-constrained environment in which a plurality of microservices belonging to the system under test are running, such as all microservices of the system. In a normal sequence of operations, the test environment could fail due to a particular microservice taking up too much CPU/memory, or other resources, or trying to run too many microservices that one or more of the microservices do not execute due to CPU/memory, or other resource, constraints. The microservice test environment reconfiguration execution facility or module disclosed herein advantageously determines which microservices are required to run a test and the resource capacity of the test environment, and when necessary, removes one or more active microservices from the test environment as needed, deploys the microservice test to the test environment, restores removed resources, and generates, for instance, a test execution report.

Figure 5A:
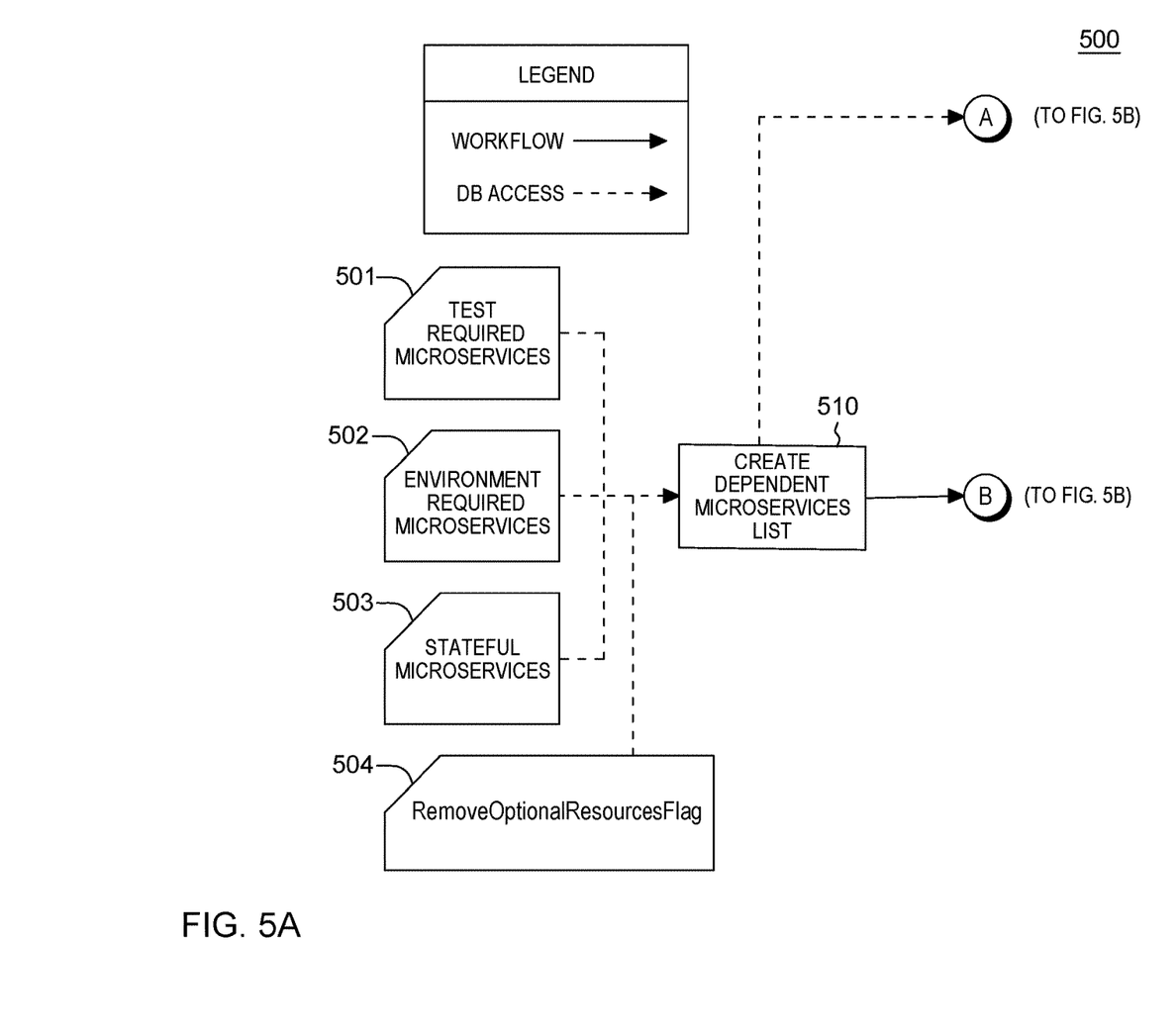
FIGS. 5A-5C depict a further embodiment of a microservice test environment reconfiguration and execution workflow, in accordance with one or more aspects of the present invention.
Figure 5B:
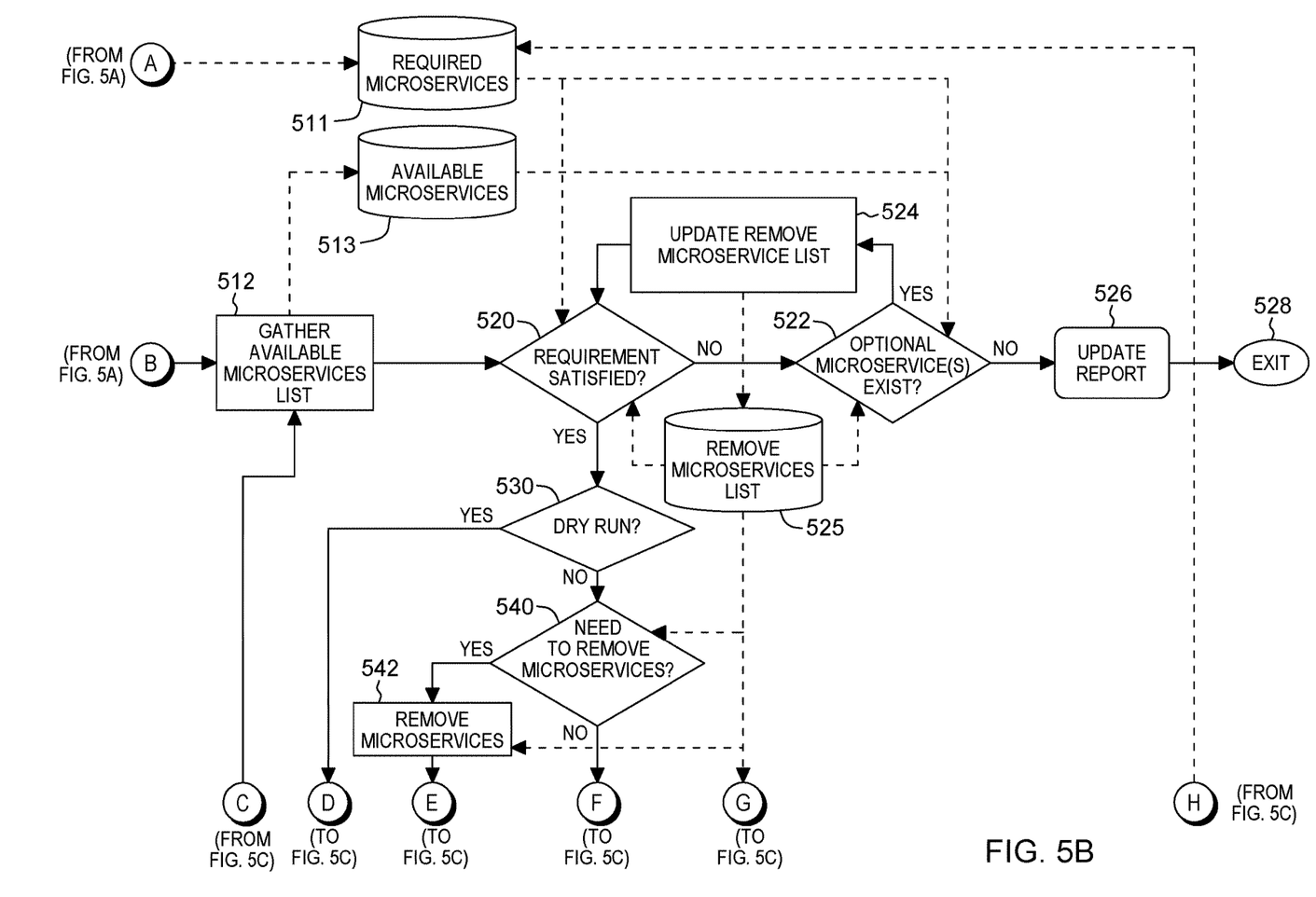
Figure 5C:
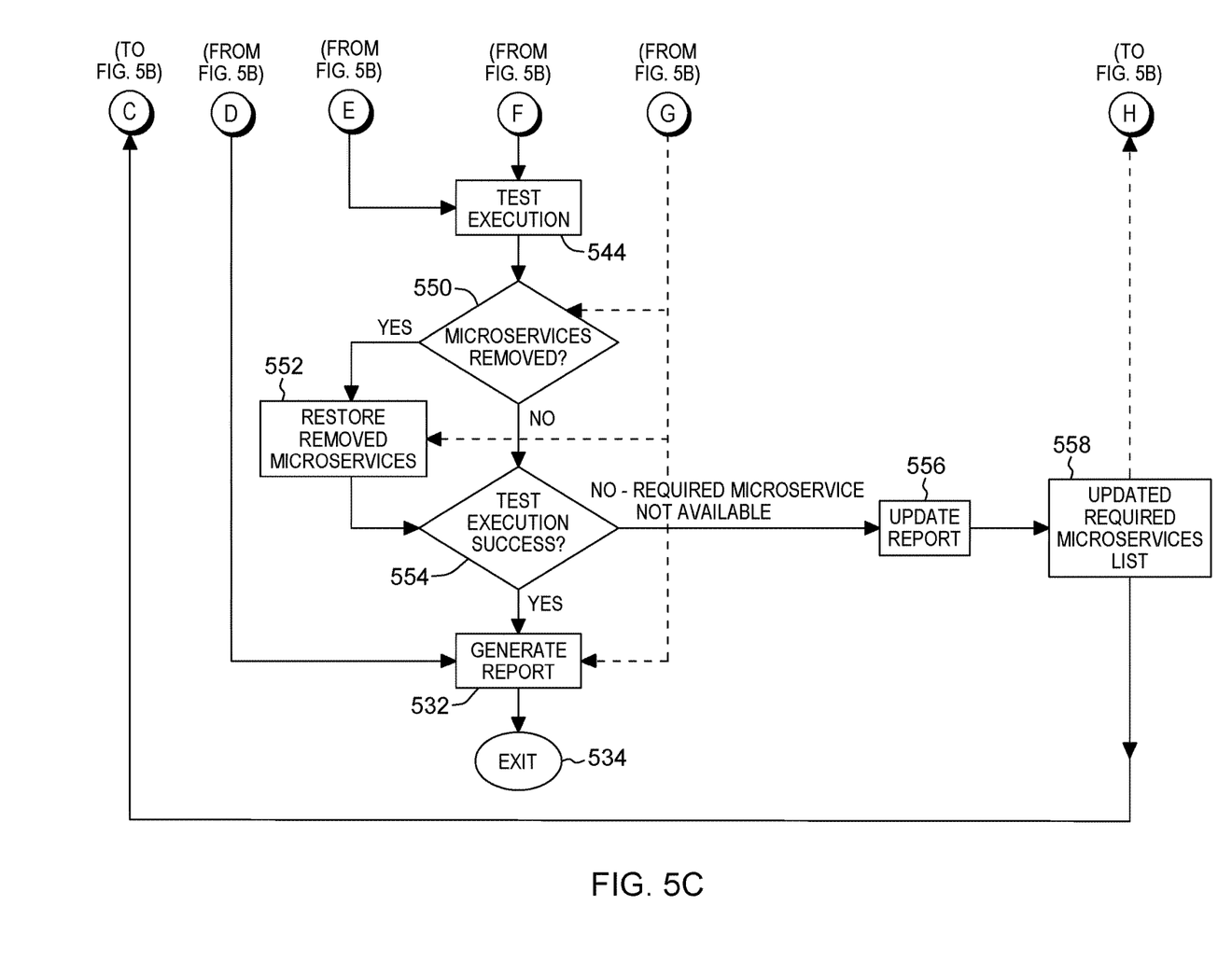

FIGS. 5A-5C depict a further embodiment of a microservice test environment reconfiguration and execution workflow 500, in accordance with one or more aspects of the present invention. In workflow 500, the main flow and the database accesses are separately indicated. Test-required microservices 501 is part of a test-dependency definition of resources needed for a test suite (e.g., CPU, memory, additional resources in the test environment, such as dependent microservices, pods, services, configmaps, ingress, etc.). The definition includes a required list of microservices that cannot be evacuated during the entire test execution. Further, in one or more embodiments, the definition can include a RemoveOptionalResourcesFlag 504, which can be used to ensure only required resources will be running in a test environment during a particular test. In addition, in one embodiment, environment-required microservices 502 are identified in a list, which are resources needed for the test environment itself, independent of the test suite (e.g., API server, Vault), and this list can be added to the list of microservices not to be removed. Further, stateful microservices 503 may be a list of resources that may need to maintain state. These also cannot be removed, and are added to the list or set of microservices needed to execute the microservice test suite.

A single, dependent microservices list 510 is created that identifies the requirements for successfully attempting to execute the current test suite in the test environment. This single, dependent microservice list is stored, in one embodiment, in a required microservices database 511. A list of available resources is also gathered 512 from, for instance, the test environment. This includes information on what microservices are executing in the test environment, and what are the CPU and/or memory configurations for the microservices in the environment. In one embodiment, the available microservices list can be stored in an available microservices database 513 for use by the processing.

In one or more embodiments, processing determines whether the microservice requirements are satisfied 520, which can include comparing the dependent microservices list from required microservices database 511 with the available microservices list from database 513 to see if all the microservice requirements are satisfied to run the test suite. If the requirements are not satisfied, processing determines whether there are any optional microservices that can be removed 522 to satisfy the resource requirement. If there are, in one embodiment, a remove microservice list is updated with the identification of that microservice for storage in a remove microservices lit or database 525. Note that the RemoveOptionalResourcesFlag 504 can be taken into consideration here to determine which resources may still need to be added to the list for removal. If there are no optional microservices remaining, processing updates a report 526, such as a user report, and exits 528 the workflow.

Assuming that the requirements are satisfied, then processing determines whether this is a dry-run request 530. If "yes", then a report is generated 532 that the requirements are satisfied, including identifying which microservices will be removed, and exits 534 the workflow. If this is not a dry-run, then processing determines whether microservices need to be removed 540. If "yes", then the microservices in the remove microservices list or database 525 are all removed 542 from the test environment, and the actual test execution 544 occurs. If there is not a need to remove microservices, then the test execution 544 occurs. Once the test environment or test harness takes over to execute a test, the test environment determines, in one embodiment, a pass/fail of the test of the test suite. Once the test is complete, workflow 500 includes determining whether microservices were removed 550 to facilitate execution of the test suite, and if "yes", then the removed microservices are restored 552 to the test environment. Otherwise, processing determines whether the test execution of the test suite was a success 554, meaning that all resources needed to run the test were present. If "no", then one or more required microservices were not available, and a report 556 is generated, or updated (for instance, a report to the user), and the required microservices list is also updated 558, which is stored back to the required microservices database 511. Otherwise, after the successful test execution 554, a results report is generated 532, after which processing exits 534 the workflow.

The prior-noted use cases illustrate the workflow discussed above. In a first test case, a new feature is being tested. The new feature is being developed and new resources (e.g., microservices) need to be deployed and tested in a test case. The new feature requires new pods or services to be spun-up to support the feature, which may not fit in the existing test environment, and which as described herein, result in removal of one or more running microservices. In this case, the resources that are needed to execute the test plan are identified, and the test plan is submitted to the system. If the system determines that new microservices cannot be created with the existing system configuration, it spins-down, i.e., removes, one or more active microservices (e.g., pods, servers, etc.) that are marked as optional in the test case. This process is continued until there are sufficient resources in the test environment to execute the new microservice test. Once the resources required for the microservice test suite to execute are available, then the microservice test environment reconfiguration and execution facility initiates execution of the test(s).

Another use case disclosed herein is performance-testing a feature. Performance-testing is needed where microservices in a test case require, for instance, larger limits (CPU and/or memory) to execute a performance test. For test isolation, any microservices on the list of optional microservices are removed so the most accurate performance metrics can be generated in the test. Thus, in this use case, all unneeded microservices are removed. For instance, when doing performance-testing on a microservice for flight services, the microservices for billing need not be executed, and can be spun-down to eliminate those microservices and reduce load on the test environment. In this use case, all microservices other than those labeled as required by the microservice test suite are removed or evacuated, for instance, by setting the RemoveOptionalResourcesFlag to true.

In another use case, the workflow discussed herein applies to test suites of existing features. For instance, a test case that has previously executed successfully can fail due to the addition of new microservices or a change in resource requirements of existing microservices running within the microservice test environment. The workflow disclosed herein addresses this case as well, and a new run of the prior executed test suite may result in a different subset of resources being removed compared to the previous run of the same test suite, which may or may not have needed any microservice to be removed.

In a further use case, the workflow disclosed herein can account for changes in the test environment itself. For instance, available resources, such as CPU and memory capacity of the test environment, can decrease due to a server failure, which can result in a reduction in the ability to run microservices in the test environment (i.e., either the number of microservices, or the available resources allocated to each microservice can decrease). In this scenario, the workflow dynamically reevaluates which microservices are required for a particular test case to successfully run, which can include removal of different microservices from a previous successful test case execution.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:
   determining a set of microservices needed to execute a microservice test suite in a test environment, the test environment being an active microservice test environment with a plurality of microservices;
   determining that the test environment lacks sufficient resources to execute the microservice test suite with the set of microservices;
   dynamically removing at least one microservice of the plurality of microservices from the test environment not needed to execute the microservice test suite, wherein the dynamically removing frees test environment resources to facilitate executing the microservice test suite with the set of microservices; and
   based on the dynamically removing of the at least one microservice, initiating executing the microservice test suite in the test environment.

2. The computer-implemented method of claim 1, further comprising generating a data structure identifying the at least one microservice dynamically removed from the test environment to free test environment resources.

3. The computer-implemented method of claim 2, further comprising restarting the dynamically-removed at least one microservice identified in the data structure to reinstate the dynamically-removed at least one microservice in the test environment, the restarting being based on a successful executing of the microservice test suite with the set of microservices in the test environment.

4. The computer-implemented method of claim 1, wherein the dynamically removing the at least one microservice includes iteratively dynamically removing microservices of the plurality of microservices from the test environment until the test environment possess sufficient resources for a successful execution of the microservice test suite with the set of microservices.

5. The computer-implemented method of claim 4, wherein the iteratively dynamically removing microservices of the plurality of microservices comprises removing another microservice of the plurality of microservices from the test environment and determining whether the test environment has sufficient resources to successfully execute the microservice test suite with the set of microservices in the test environment based on the removing of the other microservice from the test environment.

6. The computer-implemented method of claim 1, further comprising determining, based on executing of the microservice test suite in the test environment, that another microservice is needed to execute the microservice test suite, and updating the set of microservices needed to execute the microservice test suite to include the other microservice.

7. The computer-implemented method of claim 6, further comprising repeating the dynamically removing and the initiating executing based on the updating of the set of microservices needed to execute the microservice test suite in the test environment.

8. The computer-implemented method of claim 1, wherein the executing further comprises generating a test result report identifying the at least one microservice dynamically removed from the test environment to execute the microservice test suite in the test environment.

9. A computer system for facilitating processing within a computing environment, the computer system comprising:
   a memory; and
   at least one processor in communication with the memory, wherein the computer system is configured to perform a method, the method comprising:
      determining a set of microservices needed to execute a microservice test suite in a test environment, the test environment being an active microservice test environment with a plurality of microservices;
      determining that the test environment lacks sufficient resources to execute the microservice test suite with the set of microservices;
      dynamically removing at least one microservice of the plurality of microservices from the test environment not needed to execute the microservice test suite, wherein the dynamically removing frees test environment resources to facilitate executing the microservice test suite with the set of microservices; and
      based on the dynamically removing of the at least one microservice, initiating executing the microservice test suite in the test environment.

10. The computer system of claim 9, further comprising generating a data structure identifying the at least one microservice dynamically removed from the test environment to free test environment resources.

11. The computer system of claim 10, further comprising restarting the dynamically-removed at least one microservice identified in the data structure to reinstate the dynamically-removed at least one microservice in the test environment, the restarting being based on a successful executing of the microservice test suite with the set of microservices in the test environment.

12. The computer system of claim 9, wherein the dynamically removing the at least one microservice includes iteratively dynamically removing microservices of the plurality of microservices from the test environment until the test environment possess sufficient resources for a successful execution of the microservice test suite with the set of microservices.

13. The computer system of claim 12, wherein the iteratively dynamically removing microservices of the plurality of microservices comprises removing another microservice of the plurality of microservices from the test environment and determining whether the test environment has sufficient resources to successfully execute the microservice test suite with the set of microservices in the test environment based on the removing of the other microservice from the test environment.

14. The computer system of claim 9, further comprising determining, based on executing of the microservice test suite in the test environment, that another microservice is needed to execute the microservice test suite, and updating the set of microservices needed to execute the microservice test suite to include the other microservice.

15. The computer system of claim 14, further comprising repeating the dynamically removing and the initiating executing based on the updating of the set of microservices needed to execute the microservice test suite in the test environment.

16. A computer program product for facilitating processing within a computing environment, the computer program product comprising:
   one or more computer-readable storage media and program instructions collectively stored on the one or more computer-readable storage media to perform a method comprising:
      determining a set of microservices needed to execute a microservice test suite in a test environment, the test environment being an active microservice test environment with a plurality of microservices;
      determining that the test environment lacks sufficient resources to execute the microservice test suite with the set of microservices;
      dynamically removing at least one microservice of the plurality of microservices from the test environment not needed to execute the microservice test suite, wherein the dynamically removing frees test environment resources to facilitate executing the microservice test suite with the set of microservices; and
      based on the dynamically removing the at least one microservice, initiating executing the microservice test suite in the test environment.

17. The computer program product of claim 16, further comprising generating a data structure identifying the at least one microservice dynamically removed from the test environment to free test environment resources, and restarting the dynamically-removed at least one microservice identified in the data structure to reinstate the dynamically-removed at least one microservice in the test environment, the restarting being based on a successful executing of the microservice test suite with the set of microservices in the test environment.

18. The computer program product of claim 16, wherein the dynamically removing the at least one microservice includes iteratively dynamically removing microservices of the plurality of microservices from the test environment until the test environment possess sufficient resources for a successful execution of the microservice test suite with the set of microservices.

19. The computer program product of claim 16, further comprising determining, based on executing of the microservice test suite in the test environment, that another microservice is needed to execute the microservice test suite, and updating the set of microservices needed to execute the microservice test suite to include the other microservice.

20. The computer program product of claim 19, further comprising repeating the dynamically removing and the initiating executing based on the updating of the set of microservices needed to execute the microservice test suite in the test environment.

* * * * *